(12) United States Patent
Mijolovic et al.

(10) Patent No.: US 8,389,775 B2
(45) Date of Patent: Mar. 5, 2013

(54) PROCESS FOR PREPARING POLYETHER ALCOHOLS

(75) Inventors: Darijo Mijolovic, Mannheim (DE); Andrea Haunert, Singapore (SG); Andreas Kunst, Ludwigshafen (DE); Stephan Bauer, Hochheim (DE); Qiang Miao, Mannheim (DE); Berend Eling, Lemfoerde (DE)

(73) Assignee: BASF SE, Ludwigshafen (DE)

( * ) Notice: Subject to any disclaimer, the term of this patent is extended or adjusted under 35 U.S.C. 154(b) by 53 days.

(21) Appl. No.: 12/864,425

(22) PCT Filed: Jan. 26, 2009

(86) PCT No.: PCT/EP2009/050812
§ 371 (c)(1),
(2), (4) Date: Jul. 23, 2010

(87) PCT Pub. No.: WO2009/095363
PCT Pub. Date: Aug. 6, 2009

(65) Prior Publication Data
US 2010/0298460 A1 Nov. 25, 2010

(30) Foreign Application Priority Data
Jan. 29, 2008 (EP) ..................................... 08150748

(51) Int. Cl.
*C07C 45/00* (2006.01)
*C08G 18/00* (2006.01)

(52) U.S. Cl. ........ 568/453; 568/451; 568/458; 568/459; 568/462; 568/866; 568/867; 528/74.5; 528/85; 521/137; 521/155; 521/156; 521/157; 521/158; 521/159; 521/160; 521/170; 521/172; 521/174

(58) Field of Classification Search .................. 568/451, 568/453, 458, 459, 462, 866, 867; 521/137, 521/155, 156, 157, 158, 160, 170, 172, 174; 528/74.5, 85
See application file for complete search history.

(56) References Cited

U.S. PATENT DOCUMENTS

| 4,216,343 A * | 8/1980 | Rogier ........................... 568/853 |
| 6,686,435 B1 | 2/2004 | Petrovic et al. |
| 7,615,658 B2 * | 11/2009 | Lysenko et al. ................ 554/143 |
| 2006/0167125 A1 | 7/2006 | Bauer et al. |
| 2006/0193802 A1 | 8/2006 | Lysenko et al. |
| 2007/0123725 A1 | 5/2007 | Lorenz |
| 2007/0161829 A1 * | 7/2007 | Van Driessche .............. 568/883 |
| 2008/0125569 A1 * | 5/2008 | Wehmeyer et al. ........... 528/361 |

FOREIGN PATENT DOCUMENTS

| DD | 203 734 | 11/1983 |
| DD | 203 735 | 11/1983 |
| DE | 199 60 148 | 6/2001 |
| DE | 10 2004 047 524 | 3/2006 |
| EP | 0 654 302 | 5/1995 |
| EP | 0 862 947 | 9/1998 |
| EP | 1 537 159 | 6/2005 |
| EP | 1 790 678 | 5/2007 |
| GB | 2 278 350 | 11/1994 |
| JP | 2005 320431 | 11/2005 |
| JP | 2005 320437 | 11/2005 |
| WO | 98 52689 | 11/1998 |
| WO | 00 74844 | 12/2000 |
| WO | 2004 096744 | 11/2004 |
| WO | 2004 096883 | 11/2004 |
| WO | 2005 033167 | 4/2005 |
| WO | 2006 012344 | 2/2006 |
| WO | 2006 047436 | 5/2006 |
| WO | 2007 085548 | 8/2007 |

OTHER PUBLICATIONS

International Search Report issued May 18, 2009 in PCT/EP09/050812 filed Jan. 26, 2009.
Act Natural, "Are Polyols Based on Renewable Feed-Stocks Moving Into the Mainstream?" Urethanes Technology, pp. 24-35 (Aug./Sep. 2005).
U.S. Appl. No. 13/321,323, filed Nov. 21, 2011, Eling, et al.
U.S. Appl. No. 13/381,116, filed Dec. 28, 2011, Kunst, et al.

* cited by examiner

*Primary Examiner* — Michael L Leonard
(74) *Attorney, Agent, or Firm* — Oblon, Spivak, McClelland, Maier & Neustadt, L.L.P.

(57) ABSTRACT

The invention relates to a process for preparing polyether alcohols, which comprises the steps
a) reaction of an unsaturated natural oil or fat with a mixture of carbon monoxide and hydrogen,
b) reaction of the mixture from step a) with hydrogen,
c) reaction of the product from step b) with an alkylene oxide in the presence of a catalyst.

17 Claims, No Drawings

PROCESS FOR PREPARING POLYETHER ALCOHOLS

CROSS REFERENCE TO RELATED APPLICATIONS

The present application is the U.S. national stage under 35 U.S.C. §371 of international application PCT/EP2009/050812, filed on Jan. 26, 2009, and claims the priority under 35 U.S.C. §§119 (a)-(d) to the filing date of European Application No. 08150748.5, filed on Jan. 29, 2008.

The invention relates to a process for preparing polyether alcohols for use in flexible polyurethane foams using natural oils.

Flexible polyurethane foams are used in many industrial fields, in particular for upholstery or noise damping. They are usually produced by reaction of polyisocyanates with compounds having at least two hydrogen atoms which are reactive toward isocyanate groups in the presence of blowing agents and, if appropriate, catalysts and customary auxiliaries and/or additives.

The market is, for ecological reasons, increasingly demanding foams based on renewable raw materials (see D. Reed, Urethanes Technology, August/September, 2005, 24-35). Such foams are mostly produced using natural fats and/or oils which are usually chemically modified to introduce at least two hydrogen atoms which are reactive toward isocyanate groups before use in flexible polyurethane foams. In the chemical modifications, natural fats and/or oils are usually hydroxy-functionalized and, if appropriate, modified in one or more further steps. As examples of uses of hydroxy-functionalized fat and/or oil derivatives in PU systems, mention may be made of WO 2004/096744, WO 2005/033167, WO 2006/012344, U.S. Pat. No. 6,686,435, GB 2,278,350. In all these patent applications, the hydroxy-functionalized fats and/or oils are not reacted with alkylene oxides in a further step. As commercial products, mention may here be made of the Soyol™ polyols (Soyol R2-052, Soyol R2-052-A, Soyol R2-052-B, Soyol R2-052C, Soyol R2-052-E, Soyol R2-052-F, Soyol R2-052-G) from Urethane Soy Systems Co. (USSC), Agrol™ Soy polyols (Agrol 1.3, Agrol 1.5, Agrol 1.8, Agrol 2.0, Agrol 2.5, Agrol 2.8, Agrol 3.0, Agrol 3.5, Agrol 4.0, Agrol 5.0, Agrol 6.0, Agrol 7.0) from BioBased Technologies, BiOH™ polyols from Cargill or Natural Oil Polyols (NOP) from Dow, Merginol® grades from Hobum Oleochemicals GmbH, Sovermol® grades from Cognis Deutschland GmbH & Co. KG. A disadvantage of this class of substances, which are frequently referred to as naturally based polyols, is that they cannot completely replace the customarily used petroleum-based polyether alcohols for applications in flexible PU foam systems.

EP 1 537 159 B1 describes a process for the alkoxylation of natural raw materials using double metal cyanides, also referred to as DMC catalysts, for preparing polyetherols for low-emission flexible polyurethane foams. Here, mention is made of, in particular, castor oil as possible natural raw material. The predominant fatty acid in castor oil is ricinoleic acid at 70-85%. Ricinoleic acid naturally has one OH group. Depending on the proportion of ricinoleic acid, castor oil has an average functionality of 2.5-3.0. Chemical modification to introduce OH groups can therefore be dispensed with. It will be clear to a person skilled in the art that additional OH groups can nevertheless optionally be introduced by means of chemical processes. A disadvantage of castor oil is that its natural occurrence is very small compared to oils such as soybean, palm, rapeseed or sunflower oil. Castor oil is therefore comparatively expensive and its use in PU systems is unattractive from an economic point of view.

Naturally occurring hydroxy-functionalized fats such as castor oil have been found to be useful as starting materials for the preparation of polyether alcohols which are based on renewable raw materials, are used in flexible polyurethane foams and are obtained by addition of alkylene oxides onto H-acid compounds (see EP 1 537 159 and JP2005320437).

EP 1 709 678 describes a process for preparing polyols based on natural oils, in which unsaturated triglycerides are oxidized by means of peroxycarboxylic acids or hydrogen peroxide, the epoxide groups formed are converted into alcohol groups and these are reacted with alkylene oxides. This process is difficult to carry out and the oxidants used are not easy to handle.

WO 2004/096883 describes a process for producing flexible polyurethane foams using esterification products of hydroformylated fatty acids.

WO 2007/085548 describes a process for producing viscoelastic flexible foams produced using natural materials comprising hydroxyl groups, in particular natural fats and oils, and also their reaction products with alkylene oxides. Here too, preference is given to using castor oil.

The polyols derived from natural fats and oils which are used in the known processes for producing polyurethanes are restricted in terms of their functionality.

Since the functionality of the resulting polyether alcohol is determined essentially by the functionality of the starter molecules used for the addition reaction with alkylene oxides in the presence of a DMC catalyst, corresponding polyether alcohols based on castor oil, for example, generally have an average OH functionality of about 2.7. The petroleum-based polyether alcohols used for flexible polyurethane foams usually have OH functionalities in the range 2-4. Castor oil is therefore in principle a good starting material for the preparation of the abovementioned polyether alcohols based on natural fats. In the reaction of natural fats, DMC catalysis offers the general advantage that, in contrast to other alkoxylation processes, the proportion of dissociation products and thus the formation of odor-imparting components in the resulting flexible polyurethane foam is comparatively low. However, the use of castor oil as starter molecule for the DMC-catalyzed addition reaction of alkylene oxides is fundamentally also associated with restrictions or disadvantages: in a flexible polyurethane foam, the mechanical properties are set, inter alia, via the degree of crosslinking and thus inevitably via the choice of functionality and the chain length of the polyether alcohol used. When castor oil is used on its own, the functionality of the polyether alcohol can be adjusted to only a limited extent since, as mentioned above, the final functionality of the polyether alcohol is determined essentially by the functionality of the starter molecule. Thus, the alkoxylated castor oil has to be used in combination with other polyols in order to set particular mechanical properties of the flexible polyurethane foam in a targeted manner.

Another disadvantage of castor oil is, as indicated above, that the global availability is limited, in contrast to other commercially available oils (e.g. sunflower oil, soybean oil, rapeseed oil, palm oil, etc.).

It was an object of the invention to provide polyols based on natural fats and oils which are available inexpensively in a sufficient amount, which polyols cover a wide range of properties, in particular a wide range of functionality, and can be processed to produce polyurethanes for various applications, in particular polyurethanes having reduced emissions. The polyols should, in particular, be able to be used for producing flexible polyurethane foams.

The object is achieved by hydroxy-functionalizing a natural fat in a first reaction step by means of hydroformylation and subsequent hydrogenation and reacting this product with alkylene oxides in a second step using a catalyst, in particular a DMC catalyst.

The invention accordingly provides a process for preparing polyether alcohols, which comprises the steps
a) reaction of an unsaturated natural oil or fat with a mixture of carbon monoxide and hydrogen,
b) reaction of the mixture from step a) with hydrogen,
c) reaction of the product from step b) with an alkylene oxide in the presence of a catalyst.

The invention further provides the polyether alcohols prepared by the process of the invention.

The invention further provides a process for producing polyurethanes, in particular flexible polyurethane foams, by reacting polyisocyanates with compounds having at least two hydrogen atoms which are reactive toward isocyanate groups, wherein the polyether alcohols prepared by the process of the invention are used as compounds having at least two hydrogen atoms which are reactive toward isocyanate groups.

A DMC catalyst is preferably used as catalyst in step c).

Examples of natural, unsaturated oils and/or fats are castor oil, grape seed oil, black cumin oil, pumpkin seed oil, borage seed oil, soybean oil, wheat germ oil, rapeseed oil, sunflower oil, peanut oil, apricot kernel oil, pistachio nut oil, almond oil, olive oil, macadamian nut oil, avocado oil, sea buckthorn oil, sesame oil, hemp oil, hazelnut oil, evening primrose oil, wild rose oil, safflower oil, walnut oil, palm oil, fish oil, coconut oil, tall oil, maize germ oil, linseed oil. Preference is given to castor oil, soybean oil, palm oil, sunflower oil and rapeseed oil. Particular preference is given to soybean oil, palm oil, sunflower oil and rapeseed oil, which are also used, in particular, for biodiesel production on an industrial scale. Apart from the oils mentioned, it is also possible to use oils which have been obtained from genetically modified plants and have a different fatty acid composition.

The hydroformylation in step a) can be carried out by the customary and known method. Here, an unsaturated natural oil is, optionally in the presence of a suitable solvent, reacted with synthesis gas, i.e. a mixture of carbon monoxide and hydrogen, usually under superatmospheric pressure and in the presence of a catalyst, usually a transition metal carbonyl complex of rhodium or cobalt, for example octacarbonyldicobalt $Co_2(CO)_8$, to form aliphatic aldehyde groups.

The reaction is carried out at from 100 to 400 bar, preferably from 250 to 300 bar. The temperature is from 100 to 200° C., preferably from 150 to 190° C. The volume ratio of carbon monoxide to hydrogen is in the industrially customary range, preferably in the range from 40:60 to 60:40, in particular approximately 50:50.

After the reaction, the catalyst is deactivated and removed from the reaction mixture. The catalyst is preferably deactivated by adding acid and passing air through the reaction mixture. This results in phase separation. The organic phase is separated off and purified, preferably washed with water.

The organic phase which has been treated in this way is hydrogenated in step b). This, too, is carried out by customary and known methods. For this purpose, the purified organic phase from step b) is reacted with water, preferably in the presence of a suitable solvent. For this purpose, the organic phase is, preferably after addition of water in an amount of 5-10% by weight, reacted at a pressure of from 50 to 300 bar, in particular from 150 to 300 bar, and a temperature of from 50 to 250° C., in particular from 100 to 150° C., in the presence of hydrogenation catalysts. As hydrogenation catalysts, it is possible to use the customary heterogeneous catalysts. Preference is given to using nickel-comprising catalysts. The catalysts can, in addition to nickel, comprise further metals, for example cobalt, copper, molybdenum, palladium or platinum. The hydrogenation is preferably carried out in a fixed bed.

After the hydrogenation, the water formed and, if appropriate, the solvent is separated off and, if necessary, the product is purified.

The product obtained in this way is reacted with alkylene oxides in a further process step.

The reaction with the alkylene oxides is usually carried out in the presence of catalysts. Here, it is in principle possible to use all alkoxylation catalysts, for example alkali metal hydroxides or Lewis acids. However, preference is given to using multimetal cyanide compounds, known as DMC catalysts.

The DMC catalysts used are generally known and are described, for example, in EP 654 302, EP 862 947 and WO 00/74844.

The reaction with alkylene oxides is usually carried out at a DMC concentration of 10-1000 ppm, based on the end product. The reaction is particularly preferably carried out using a DMC concentration of 20-200 ppm. The reaction is very particularly preferably carried out using a DMC concentration of 50-150 ppm.

As alkylene oxides, it is possible to use all known alkylene oxides, for example ethylene oxide, propylene oxide, butylene oxide, styrene oxide. In particular, ethylene oxide, propylene oxide and mixtures of the compounds mentioned are used as alkylene oxides.

The hydroformylated and hydrogenated natural oils from process step b) can preferably be reacted alone with the alkylene oxides.

However, it is also possible to carry out the reaction with the alkylene oxides in the presence of costarters. As costarters, it is possible to use alcohols such as relatively high-functionality alcohols, in particular sugar alcohols, for example sorbitol, hexitol and sucrose, but usually bifunctional and/or trifunctional alcohols or water, either as individual substances or as a mixture of at least two of the costarters mentioned. Examples of bifunctional starter substances are ethylene glycol, diethylene glycol, propylene glycol, dipropylene glycol, 1,4-butanediol and 1,5-pentanediol. Examples of trifunctional starter substances are trimethylolpropane, pentaerythritol and in particular glycerol. The starter substances can also be used in the form of alkoxylates, in particular those having a molecular weight $M_n$ in the range from 62 to 15 000 g/mol. In principle, it is also possible to use castor oil or alkoxylated castor oil.

The addition reaction of the alkylene oxides in the preparation of the polyether alcohols used for the process of the invention can be carried out by known methods. Thus, it is possible to use only one alkylene oxide for preparing the polyether alcohols. When a plurality of alkylene oxides is used, a blockwise addition reaction in which the alkylene oxides are added on individually in succession or a random addition reaction in which the alkylene oxides are introduced together is possible. It is also possible for sections of blocks and random sections to be incorporated into the polyether chain in the preparation of the polyether alcohols. Furthermore, gradated or alternating sections are possible.

Polyether alcohols having a high content of secondary hydroxyl groups and a content of ethylene oxide units in the polyether chain of not more than 30% by weight, based on the weight of the polyether alcohol, are preferably used for producing flexible polyurethane slabstock foams. These polyether alcohols preferably have a propylene oxide block at the end of the chain. To produce molded flexible polyurethane foams, use is made of, in particular, polyether alcohols having a high content of primary hydroxyl groups and an ethylene oxide end block in an amount of <10% by weight, based on the weight of the polyether alcohol.

In a particular embodiment of the addition reaction of mixtures of at least two alkylene oxides, the ratio of the alkylene oxides to one another can be altered during the addition reaction, as described in DE 199 60 148 A1 and in DE 10 2004 047 524 A1.

The addition reaction of the alkylene oxides is carried out under the usual conditions, i.e. at temperatures in the range from 60 to 180° C., preferably from 90 to 140° C., in particular from 100 to 130° C., and pressures in the range from 0 to 20 bar, preferably in the range from 0 to 10 bar and in particular in the range from 0 to 5 bar. The mixture of starter substance and DMC catalyst can be pretreated by stripping as taught by WO 98/52689 before introduction of the alkylene oxides is commenced.

In a further embodiment, as described, for example, in DD 203734/735, one or more further starter alcohols, which can be identical to or different from that initially charged, is/are introduced in addition to the alkylene oxides during the synthesis.

In a further embodiment, the process can be continuous.

After the addition reaction of the alkylene oxides is complete, the polyether alcohol is worked up by customary methods by removing unreacted alkylene oxides and volatile constituents, usually by distillation, steam or gas stripping and/or other deodorization methods. If necessary, a filtration can also be carried out.

The DMC catalyst can remain in the product after the reaction.

The polyether alcohols according to the invention from process step c) preferably have an average functionality of from 2 to 4, in particular from 2 to 3, and a hydroxyl number in the range from 20 to 70 mg KOH/g, preferably from 20 to 60 mg KOH/g.

As described above, the polyether alcohols of the invention are used for producing polyurethanes, in particular flexible polyurethane foams.

The flexible polyurethane foams according to the invention can likewise be produced by customary and known methods by reacting the polyether alcohols of the invention with polyisocyanates.

As regards the starting compounds used for the process of the invention, the following details may be provided:

As polyisocyanates, it is possible to use all isocyanates having two or more isocyanate groups in the molecule in the process of the invention. Either aliphatic isocyanates such as hexamethylene diisocyanate (HDI) or isophorone diisocyanate (IPDI) or preferably aromatic isocyanates such as tolylene diisocyanate (TDI), diphenylmethane diisocyanate (MDI) or mixtures of diphenylmethane diisocyanate and polymethylenepolyphenylene polyisocyanates (crude MDI), preferably TDI and MDI, particularly preferably TDI, can be used. It is also possible to use isocyanates which have been modified by incorporation of urethane, uretdione, isocyanurate, allophanate, uretonimine and other groups, known as modified isocyanates. Preferred prepolymers are MDI prepolymers having an NCO content in the range from 20 to 35% or mixtures thereof with polymethylenepolyphenylene polyisocyanates (crude MDI).

The polyether alcohols used according to the invention can be used either alone or in combination with other compounds having at least two hydrogen atoms which are reactive toward isocyanate groups.

As compounds having at least two active hydrogen atoms which can be used together with the polyether alcohols used according to the invention, it is possible to use, in particular, polyester alcohols and preferably polyether alcohols having a functionality of from 2 to 16, in particular from 2 to 8, preferably from 2 to 4, and an average molecular weight $M_n$ in the range from 400 to 20 000 g/mol, preferably from 1000 to 8000 g/mol.

The polyether alcohols which are, if appropriate, used together with the polyether alcohols used according to the invention can be prepared by known methods, usually by catalytic addition of alkylene oxides, in particular ethylene oxide and/or propylene oxide, onto H-functional starter substances or by condensation of tetrahydrofuran. As H-functional starter substances, use is made of, in particular, polyfunctional alcohols and/or amines. Preference is given to using water, dihydric alcohols, for example ethylene glycol, propylene glycol or butanediols, trihydric alcohols, for example glycerol or trimethylolpropane, and also higher-hydric alcohols such as pentaerythritol, sugar alcohols, for example sucrose, glucose or sorbitol. Preferred amines are aliphatic amines having up to 10 carbon atoms, for example ethylenediamine, diethylenetriamine, propylenediamine, and amino alcohols such as ethanolamine or diethanolamine. As alkylene oxides, preference is given to using ethylene oxide and/or propylene oxide, with polyether alcohols used for producing molded flexible polyurethane foams frequently having an ethylene oxide block added on at the end of the chain. Catalysts used in the addition reaction of the alkylene oxides are, in particular, basic compounds, with potassium hydroxide having the greatest industrial importance. If the content of unsaturated constituents in the polyether alcohols is to be low, it is also possible to use DMC catalysts as catalysts for preparing these polyether alcohols.

For particular applications, in particular for increasing the hardness of the flexible polyurethane foams, it is also possible to make concomitant use of polymer-modified polyols. Such polyols can, for example, be prepared by in-situ polymerization of ethylenically unsaturated monomers, preferably styrene and/or acrylonitrile, in polyether alcohols. Polymer-modified polyether alcohols also include polyether alcohols comprising polyurea dispersions, which are preferably prepared by reaction of amines with isocyanates in polyols.

To produce flexible foams and integral foams, use is made of, in particular, bifunctional and/or trifunctional polyether alcohols. To produce rigid foams, use is made, in particular, of polyether alcohols prepared by addition of alkylene oxides onto tetrafunctional or higher-functional starters such as sugar alcohols or aromatic amines.

In a particular embodiment, hydroxy-functionalized fats, oils, fatty acids, fatty acid esters can additionally be used to increase the hardness.

The compounds having at least two active hydrogen atoms b) also include chain extenders and crosslinkers. As chain extenders and crosslinkers, preference is given to using 2- and 3-functional alcohols having molecular weights of from 62 to 800 g/mol, in particular in the range from 60 to 200 g/mol. Examples are ethylene glycol, propylene glycol, diethylene glycol, triethylene glycol, dipropylene glycol, tripropylene glycol, low molecular weight polypropylene oxides and polyethylene oxides, e.g. Lupranol® 1200, 1,4-butanediol, glycerol or trimethylolpropane. Diamines, sorbitol, glycerol, alkanolamines can also be used as crosslinkers. If chain extenders and crosslinkers are used, their amount is preferably up to 5% by weight, based on the weight of the compounds having at least two active hydrogen atoms.

The process of the invention is usually carried out in the presence of activators, for example tertiary amines or organic metal compounds, in particular tin compounds. As tin compounds, preference is given to using divalent tin salts of fatty acids, e.g. tin dioctoate, and organotin compounds such as dibutyltin dilaurate.

As blowing agent for producing the polyurethane foams, preference is given to using water which reacts with the isocyanate groups to liberate carbon dioxide. Water is preferably used in an amount of from 0.5 to 6% by weight, particularly preferably in an amount of from 1.5 to 5.0% by weight. It is also possible to use physically acting blowing agents, for example carbon dioxide, hydrocarbons such as n-pentane, isopentane or cyclopentane, cyclohexane or halogenated hydrocarbons such as tetrafluoroethane, pentafluoropropane, heptafluoropropane, pentafluorobutane, hexafluorobutane or dichloromonofluoroethane together with or in place of water. The amount of the physical blowing agent is preferably in the range from 1 to 15% by weight, in particular from 1 to 10% by weight, and the amount of water is preferably in the range from 0.5 to 10% by weight, in particular from 1 to 5% by weight. Among the physical blowing agents, preference is given to carbon dioxide which is preferably used in combination with water.

To produce the flexible polyurethane foams according to the invention, stabilizers and also auxiliaries and/or additives can also usually be used.

Possible stabilizers are, in particular, polyethersiloxanes, preferably water-soluble polyethersiloxanes. These compounds generally have a structure in which a long-chain copolymer of ethylene oxide and propylene oxide is joined to a polydimethylsiloxane radical.

The reaction may, if appropriate, be carried out in the presence of auxiliaries and/or additives, e.g. fillers, cell regulators, surface-active compounds and/or flame retardants. Preferred flame retardants are liquid flame retardants based on halogen-phosphorus compounds such as trichloropropyl phosphate, trichloroethyl phosphate, and halogen-free flame retardants such as Exolit® OP 560 (Clariant International Ltd).

Further information on the starting materials, catalysts and auxiliaries and additives used may be found, for example, in Kunststoff-Handbuch, Volume 7, Polyurethane, Carl-Hanser-Verlag Munich, 1st edition, 1966, $2^{nd}$ edition, 1983 and $3^{rd}$ edition, 1993.

To produce the polyurethanes according to the invention, the organic polyisocyanates are reacted with the compounds having at least two active hydrogen atoms in the presence of the blowing agents and, if appropriate, the catalysts and auxiliaries and/or additives.

In the production of the polyurethanes according to the invention, the isocyanate and the polyol component are usually combined in such amounts that the equivalence ratio of isocyanate groups to the sum of the active hydrogen atoms is from 0.7 to 1.25, preferably from 0.8 to 1.2.

The polyurethane foams are preferably produced by the one-shot process, for example by means of the high-pressure or low-pressure technique. The foams can be produced in open or closed metallic molds or by continuous application of the reaction mixture to conveyor belts to produce slabstock foams.

In the production of molded flexible foams, it is particularly advantageous to employ the two-component process in which a polyol component and an isocyanate component are prepared and foamed. The components are preferably mixed at a temperature in the range from 15 to 90° C., preferably from 20 to 60° C. and particularly preferably from 20 to 35° C., and introduced into the mold or applied to the conveyor belt. The temperature in the mold is usually in the range from 20 to 110° C., preferably from 30 to 60° C. and particularly preferably from 35 to 55° C.

Flexible slabstock foams can be foamed in plants which are operated batchwise or continuously, for example by the Planiblock process, the Maxfoam process, the Draka-Petzetakis process and the Vertifoam process.

The flexible polyurethane foams produced using polyether alcohols of the invention prepared by means of DMC catalysts have, compared to otherwise identical products in which the polyether alcohols used according to the invention have been prepared from hydroformylated and hydrogenated oils and fats by means of basic catalysts, a significantly reduced odor, significantly reduced fogging values and significantly reduced crack formation and also improved compression set, before and after aging. Furthermore, the foams according to the invention have a higher proportion of open cells, which is reflected, for example, in increased air permeability.

The process of the invention for preparing polyether alcohols firstly offers the advantage that commercially available fats such as soybean oil, sunflower oil, rapeseed oil or palm oil which are available in large quantities on the market can be used. Secondly, the functionalities of the fats and thus also the final functionalities of the resulting polyols after subsequent addition reaction with alkylene oxides can be set in a targeted manner and matched to the desired properties in the flexible polyurethane foam by variation of the reaction conditions such as pressure, temperature, type and amount of catalyst and/or reaction time or residence time.

The process of the invention likewise has advantages over the use of hydroxy-functionalized natural fats which have been prepared by epoxidation of the double bonds in the fat with subsequent ring-opening/hydrolysis of the epoxide ring for the addition reaction with alkylene oxides, as described in JP 2005320431 and WO 2006/047436. Thus, the use of epoxidized/ring-opened fats has, compared to the use of hydroformylated/hydrogenated fats, the disadvantage that unhydrolyzed epoxide groups can also react in the addition reaction with alkylene oxides. This can lead to increased crosslinking of the polyether alcohol and a broad molecular weight distribution and thus to high viscosities, which has an adverse effect on the processability and on the mechanical properties of the resulting flexible polyurethane foam. In addition, the process for preparing alkoxylated products based on epoxidized/ring-opened hydroxy fats is associated with higher manufacturing costs, since starting materials which corrode conventional grades of steel and accordingly demand costly reactor materials are used in the epoxidation process.

The invention is illustrated by the following examples.

EXAMPLE 1

Soybean Oil

Hydroformylation and Subsequent Hydrogenation 750 g of soybean oil glyceride were reacted batchwise with 0.13% by weight of octacarbonyldicobalt as catalyst with addition of 75 g of water at 160° C. and under a synthesis gas pressure of 280 bar at a mixing ratio of hydrogen to carbon monoxide of 1:1 in an autoclave for 10 hours. The consumption of synthesis gas could be seen from a decrease in the pressure in the autoclave and the amount consumed was replaced by injection of further synthesis gas. After depressurization of the autoclave, the reaction product mixture was admixed with 10% strength by weight acetic acid and freed oxidatively of the cobalt catalyst by introduction of air. The organic product phase formed was separated off, washed with water, separated off from the aqueous phase and hydrogenated in the presence of Raney nickel at 125° C. and a hydrogen pressure of 280 bar for 10 hours. The reaction product mixture had the following properties:
Iodine number: 2.5 of iodine/100 g
CO number: 7 mg KOH/g
OH number: 136 mg KOH/g
Acid number: 1.6 mg KOH/g

EXAMPLE 2

Rapeseed Oil

Hydroformylation and Subsequent Hydrogenation 750 g of rapeseed oil glyceride were reacted batchwise with 0.13% by weight of octacarbonyldicobalt as catalyst with addition of 75 g of water at 160° C. and under a synthesis gas pressure of 280 bar at a mixing ratio of hydrogen to carbon monoxide of 1:1 in an autoclave for 10 hours. The consumption of synthesis gas could be seen from a decrease in the pressure in the autoclave and the amount consumed was replaced by injection of further synthesis gas. After depressurization of the autoclave, the reaction product mixture was admixed with 10% strength by weight acetic acid and freed oxidatively of the cobalt catalyst by introduction of air. The organic product phase formed was separated off, washed with water, separated off from the aqueous phase and hydrogenated in the presence of Raney nickel at 125° C. and a hydrogen pressure of 280 bar for 10 hours. The reaction product mixture had the following properties:
Iodine number: 3.5 of iodine/100 g
CO number: 5 mg KOH/g
OH number: 140 mg KOH/g
Acid number: 2.1 mg KOH/g

EXAMPLE 3

Sunflower Oil

Hydroformylation and Subsequent Hydrogenation 750 g of sunflower oil glyceride were reacted batchwise with 0.13% by weight of octacarbonyldicobalt as catalyst with addition of 75 g of water at 160° C. and under a synthesis gas pressure of 280 bar at a mixing ratio of hydrogen to carbon monoxide of 1:1 in an autoclave for 10 hours. The consumption of synthesis gas could be seen from a decrease in the pressure in the autoclave and the amount consumed was replaced by injection of further synthesis gas. After depressurization of the autoclave, the reaction product mixture was admixed with 10% strength by weight acetic acid and freed oxidatively of the cobalt catalyst by introduction of air. The organic product phase formed was separated off, washed with water, separated off from the aqueous phase and hydrogenated in the presence of Raney nickel at 125° C. and a hydrogen pressure of 280 bar for 10 hours. The reaction product mixture had the following properties:
Iodine number: 1.2 of iodine/100 g
CO number: 5 mg KOH/g
OH number: 120 mg KOH/g
Acid number: 2.5 mg KOH/g

EXAMPLE 4

Preparation of a Polyether Alcohol from the Product of Example 1 by Means of DMC Catalysis 700 g of the hydroxy-functionalized soybean oil prepared in Example 1 were admixed with 3.3 g of a 5.97% strength suspension of a zinc hexacyanocobaltate in a 5 liter stirred tank reactor and dewatered at 130° C. and a reduced pressure of about 40 mbar for 30 minutes. 261 g of propylene oxide were subsequently introduced and commencement of the reaction was awaited; commencement of the reaction could be recognized from a brief increase in the temperature and a rapid drop in the pressure in the reactor. 1651 g of a mixture of 1390 g of propylene oxide and 261 g of ethylene oxide were subsequently metered in at the same temperature over a period of 1.5 hours. When the reactor pressure had become constant, unreacted monomers and other volatile constituents were distilled off under reduced pressure and the product was drained. The polyether alcohol was not worked up in an additional deodorization column.

The colorless polyether alcohol obtained had the following properties:

| | |
|---|---|
| Hydroxyl number | 52 mg KOH/g |
| Acid number | 0.048 mg KOH/g |
| Water content | 0.01% |
| Viscosity (25° C.) | 530 mPa·s |
| Pt/Co color number | 56 |
| Alkalinity | <1 ppm |
| $M_w$ | 3256 g/mol |
| Polydispersity D | 1.56 |
| Odor: | 1.3 |

EXAMPLE 5

Preparation of a Polyether Alcohol from the Product of Example 2 by Means of DMC Catalysis 680 g of the hydroxy-functionalized rapeseed oil prepared in Example 2 were admixed with 3.2 g of a 5.97% strength suspension of a zinc hexacyanocobaltate in a 5 liter stirred tank reactor and dewatered at 130° C. and a reduced pressure of about 40 mbar for 30 minutes. 254 g of propylene oxide were subsequently introduced and commencement of the reaction was awaited; commencement of the reaction could be recognized from a brief increase in the temperature and a rapid drop in the pressure in the reactor. 1603 g of a mixture of 1349 g of propylene oxide and 254 g of ethylene oxide were subsequently metered in at the same temperature over a period of 1.5 hours. When the reactor pressure had become constant, unreacted monomers and other volatile constituents were distilled off under reduced pressure and the product was drained. The polyether alcohol was not worked up in an additional deodorization column.

The colorless polyether alcohol obtained had the following properties:

| | |
|---|---|
| Hydroxyl number | 51 mg KOH/g |
| Acid number | 0.005 mg KOH/g |
| Water content | 0.01% |
| Viscosity (25° C.) | 593 mPa·s |
| Pt/Co color number | 31 |
| Alkalinity | <1 ppm |

-continued

| $M_w$ | 3288 g/mol |
| Polydispersity D | 1.61 |
| Odor: | 1.5 |

EXAMPLE 6

Preparation of a Polyether Alcohol from the Product of Example 3 by Means of DMC Catalysis 728 g of the hydroxy-functionalized sunflower oil prepared in Example 3 were admixed with 3.4 g of a 5.97% strength suspension of a zinc hexacyanocobaltate in a 5 liter stirred tank reactor and dewatered at 130° C. and a reduced pressure of about 40 mbar for about 30 minutes. 271 g of propylene oxide were subsequently introduced and commencement of the reaction was awaited; commencement of the reaction could be recognized from a brief increase in the temperature and a rapid drop in the pressure in the reactor. 1716 g of a mixture of 1444 g of propylene oxide and 272 g of ethylene oxide were subsequently metered in at the same temperature over a period of 1.5 hours. When the reactor pressure had become constant, unreacted monomers and other volatile constituents were distilled off under reduced pressure and the product was drained. The polyether alcohol was not worked up in an additional deodorization column.

The colorless polyether alcohol obtained had the following properties:

| Hydroxyl number | 49 mg KOH/g |
| Acid number | 0.041 mg KOH/g |
| Water content | 0.01% |
| Viscosity (25° C.) | 602 mPa · s |
| Pt/Co color number | 35 |
| Alkalinity | <1 ppm |
| $M_w$ | 3151 g/mol |
| Polydispersity D | 1.74 |
| Odor: | 1.4 |

The following properties were determined according to the standards, internal test methods or measurement methods mentioned below:

| Water content in % by weight: | DIN 51777 |
| Hydroxyl number in mgKOH/g | DIN 53240 |
| Acid number in mgKOH/g | DIN EN ISO 3682 |
| Viscosity (25° C.): in mPa · s | DIN 51 550 |
| Pt/Co color number: | DIN ISO 6271 |
| Iodine number in g of $I_2$/100 g | DIN 53241 |
| CO number in mgKOH/g | DIN 53173 |
| Alkalinity in ppm: | Titrimetrically |
| $M_n$ in g/mol: | average number average molecular weight determined by means of gel permeation chromatography |
| Polydispersity D = $M_w/M_n$ | determined by means of gel permeation chromatography |
| Odor: | Test method PPU 03/03-04 of Feb. 15, 2002 |

Production of Flexible Polyurethane Foams

The starting materials listed in Table 1 were reacted in the ratios shown in Table 1.

All components apart from the isocyanate Lupranat® T80A were firstly combined by intensive mixing to form a polyol component. The Lupranat® T80 A was then added while stirring and the reaction mixture was poured into an open mold in which it foamed to produce the polyurethane foam. The properties of the foams obtained are shown in Table 1.

The following properties were determined in accordance with the standards, operating procedures and test procedures mentioned below:

| Foam density in kg/m³ | DIN EN ISO 845 |
| VOC ricinoleic acid cycle in ppm | PB VWL 709 |
| FOG ricinoleic acid cycle in ppm | PB VWL 709 |
| Air permeability in dm³/min | DIN EN ISO 7231 |
| Compressive strength, 40% deformation in kPa | DIN EN ISO 2439 |
| Indentation hardness, 25% deformation | DIN EN ISO 2439 |
| Indentation hardness, 40% deformation | DIN EN ISO 2439 |
| Indentation hardness, 65% deformation | DIN EN ISO 2439 |
| Elongation in % in accordance with | DIN EN ISO 1798 |
| Tensile strength in kPa | DIN EN ISO 1798 |
| Rebound resilience in % | DIN EN ISO 8307 |
| Compression set in % | DIN EN ISO 3386 |
| Wet compression set | operating procedure AA U10-131-041 of Feb. 6, 2002 |

The determination of the wet compression set was carried out in accordance with the operating procedure AA U10-131-041 of Feb. 6, 2002:

The height of a previously marked point on the foam test specimens having dimensions of 50 mm×50 mm×25 mm is determined by means of a sliding caliper or measurement caliper. The test specimens are subsequently placed between two pressure plates and compressed to the height by means of a clamping device using 7.5 mm spacers.

Storage in a controlled atmosphere cabinet at 50° C. and 95% relative atmospheric humidity commences immediately after clamping. After 22 hours, the foam test specimens are quickly removed from the clamping device and stored in the standard atmosphere for 30 minutes on a surface having a low thermal conductivity (tray) to enable relaxation to take place. The final height at the marked point is subsequently determined using the same means of measurement.

The wet compression set is based on the deformation and is calculated as follows:

$$\text{Wet compression set} = h_0 - h_R * 100/(h_0 - 7.5 \text{ mm}) \text{ in \%}$$

$h_0$ original height in mm $h_R$ final height of the test specimen in mm

TABLE 1

| | Example 4/1 | Comparison 1 | Example 4/2 | Comparison 2 |
|---|---|---|---|---|
| Lupranol ® 2084 | | 100.00 | | 100.00 |
| Polyether, as per Example 4 | 100.00 | | 100.00 | |
| Tegoamin ® B 4900 | 1.00 | 1.00 | 1.00 | 1.00 |
| Dabco ® NE 500 | 0.20 | 0.20 | 0.30 | 0.30 |
| Kosmos ® EF | 0.45 | 0.45 | 0.45 | 0.45 |
| Kosmos ® 54 | 0.15 | 0.15 | 0.15 | 0.15 |
| Water (additional) | 3.80 | 3.80 | 2.30 | 2.30 |
| Lupranat ® T80A - index | 110 | 110 | 115 | 115 |
| Air permeability in $dm^3$/min | 98 | 115 | 56 | 62 |
| VOC in ppm | 1 | 3 | 2 | 4 |
| FOG in ppm | 82 | 93 | 108 | 115 |
| of which Irganox 1135 | 80 | 92 | 105 | 113 |
| Foam density in kg/$m^3$ | 25.8 | 26.1 | 37.3 | 38.5 |
| Tensile strength in kPa | 31 | 156 | 107 | 115 |
| Elongation in % | 215 | 236 | 201 | 199 |
| Compressive strength, 40% deformation in kPa | 3.5 | 3.2 | 3.4 | 3.7 |
| Compression set in % | 2.4 | 2.3 | 3.0 | 2.8 |
| Wet compression set | 15.1 | 16.2 | 11.4 | 9.2 |
| Rebound resilience in % | 49 | 45 | 51 | 54 |
| Indentation hardness, 40% deformation | 154 | 125 | 136 | 156 |
| Hot humid storage in accordance with DIN EN ISO 2240 | | | | |
| Compressive strength, 40% deformation in kPa | −27 | −31 | −36 | −53 |
| Tensile strength in kPa | −34 | −43 | −3 | −28 |
| Elongation in % | −9 | −5 | +10 | +25 |
| Compression set in % | 3.0 | 2.3 | 2.7 | 2.0 |

TABLE 2

| | Example 5/1 | Example 5/2 | Example 6/1 | Example 6/2 |
|---|---|---|---|---|
| Polyether as per Examples 5 and 6 | 100.00 | 100.00 | 100.00 | 100.00 |
| Tegoamin ® B 4900 | 1.00 | 1.00 | 1.00 | 1.00 |
| Dabco ® NE 500 | 0.20 | 0.20 | 0.30 | 0.30 |
| Kosmos ® EF | 0.45 | 0.45 | 0.45 | 0.45 |
| Kosmos ® 54 | 0.15 | 0.15 | 0.15 | 0.15 |
| Water (additional) | 3.80 | 2.30 | 3.80 | 2.30 |
| Lupranat ® T80A - index | 110 | 115 | 110 | 115 |
| Air permeability in $dm^3$/min | 93 | 62 | 111 | 82 |
| VOC in ppm | 2 | 4 | 2 | 1 |
| FOG in ppm | 74 | 85 | 110 | 98 |
| of which Irganox 1135 | 69 | 78 | 105 | 92 |
| Foam density in kg/$m^3$ | 26.3 | 25.5 | 34.2 | 36.3 |
| Tensile strength in kPa | 128 | 146 | 116 | 109 |
| Elongation in % | 209 | 252 | 199 | 205 |
| Compressive strength, 40% deformation in kPa | 3.3 | 3.5 | 3.6 | 3.4 |
| Compression set in % | 2.6 | 2.1 | 2.9 | 3.1 |
| Wet compression set | 14.1 | 15.4 | 12.6 | 10.8 |
| Rebound resilience in % | 51 | 47 | 55 | 49 |
| Indentation hardness, 40% deformation | 148 | 133 | 142 | 160 |
| Hot humid storage in accordance with DIN EN ISO 2240 | | | | |
| Compressive strength, 40% deformation in kPa | −15 | −28 | −32 | −50 |
| Tensile strength in kPa | −32 | −40 | −28 | −31 |
| Elongation in % | −5 | +8 | −7 | +12 |
| Compression set in % | 2.7 | 2.9 | 2.5 | 3.1 |

Notes for the tables
Lupranol ® 2084 polyetherol having a hydroxyl number of 48 mgKOH/g and a viscosity of 600 mPa · s (BASF Aktiengesellschaft)
Dabco ® NE 500: incorporatable amine catalyst (Air Products and Chemicals, Inc.)
Kosmos ® EF: incorporatable tin catalyst (Degussa AG)
Kosmos ® 54: incorporatable metal catalyst (Degussa AG)
Tegostab ® B 4900: silicone stabilizer (Degussa AG)
Lupranat T80 A: tolylene 2,4-/2,6-diisocyanate mixture in a ratio of 80:20 (BASF Aktiengesellschaft)

The invention claimed is:

1. A process for preparing a polyether alcohol, the process comprising:
   (a) reacting an unsaturated natural oil or fat with a mixture of carbon monoxide and hydrogen in the presence of a first catalyst, to obtain a first reaction mixture;
   (b) deactivating and removing the first catalyst from the first reaction mixture from (a), by contacting the first reaction mixture with an acid, to obtain a second reaction mixture;
   (c) reacting the second reaction mixture from (b) with hydrogen, to obtain a first product; and
   (d) reacting the first product from (c) with an alkylene oxide in the presence of a second catalyst.

2. The process of claim 1, wherein the second catalyst comprises a DMC catalyst.

3. The process of claim 1, wherein the natural oil or fat is at least one selected from the group consisting of castor oil, grape seed oil, black cumin oil, pumpkin seed oil, borage seed oil, soybean oil, wheat germ oil, rapeseed oil, sunflower oil, peanut oil, apricot kernel oil, pistachio nut oil, almond oil, olive oil, macadamia nut oil, avocado oil, sea buckthorn oil, sesame oil, hemp oil, hazelnut oil, evening primrose oil, wild rose oil, safflower oil, walnut oil, palm oil, fish oil, coconut oil, tall oil, maize germ oil, and linseed oil.

4. The process of claim 1, wherein the natural oil or fat is at least one selected from the group consisting of castor oil, soybean oil, palm oil, sunflower oil, and rapeseed oil.

5. The process of claim 1, wherein the natural oil or fat is at least one selected from the group consisting of soybean oil, palm oil, sunflower oil, and rapeseed oil.

6. The process of claim 1, wherein the first catalyst comprises a transition metal carbonyl complex of rhodium.

7. The process of claim 1, wherein (c) is carried out in the presence of a third catalyst.

8. The process of claim 7, wherein the third catalyst comprises a heterogeneous, nickel-comprising catalyst.

9. A process for producing a polyurethane, the process comprising:
   preparing a polyether alcohol (B) according to the process of claim 1 and reacting a polyisocyanate (A) with the compound (B) having at least two hydrogen atoms which are reactive toward an isocyanate group.

10. The process of claim 9, wherein the polyurethane produced is a flexible polyurethane foam.

11. The process of claim 1, wherein the first catalyst comprises a transition metal carbonyl complex of cobalt.

12. The process of claim 1, wherein (b) further comprises contacting the first mixture with air.

13. The process of claim 1, wherein the acid comprises acetic acid.

14. The process of claim 1, wherein the polyether alcohol produced after (d) has a maximum polydispersity index of 1.74.

15. The process of claim 1, wherein the polyether alcohol produced after (d) has a polydispersity index in a range of from 1.56 to 1.74.

16. The process of claim 1, wherein the polyether alcohol produced after (d) comprises a polyether alcohol with an average functionality of from 2 to 4, and a hydroxyl number in a range of from 20 to 70 mg KOH/g.

17. The process of claim 2, wherein the DMC catalyst is present in an amount of from 20 to 200 ppm, based on the polyether alcohol.

* * * * *